United States Patent [19]

Ritter

[11] Patent Number: 4,467,999

[45] Date of Patent: Aug. 28, 1984

[54] DIAPHRAGM VALVE FOR MULTIPLE VESSEL CASCADE GAS ENRICHMENT SYSTEM

[76] Inventor: Robert A. Ritter, 5108 Varscliff Rd. NW., Calgary, Alberta, Canada

[21] Appl. No.: 350,413

[22] Filed: Feb. 19, 1982

Related U.S. Application Data

[62] Division of Ser. No. 107,860, Dec. 28, 1979, Pat. No. 4,321,069.

[30] Foreign Application Priority Data

Oct. 26, 1979 [CA] Canada .................................. 338533

[51] Int. Cl.³ .............................................. F16K 9/00
[52] U.S. Cl. ...................................... 251/61.1; 251/5
[58] Field of Search ....................... 251/61, 61.1, 61.2, 251/5, 335 A, 331; 92/92, 98 R; 138/93

[56] References Cited

U.S. PATENT DOCUMENTS

| 2,781,051 | 2/1957  | Hawley    | 251/61.1 X |
| 3,282,288 | 11/1966 | Sheppard  | 251/331 X  |
| 3,465,786 | 9/1969  | Spisak    | 251/61.1 X |
| 3,915,010 | 10/1975 | Tricon    | 92/92 X    |
| 4,135,550 | 1/1979  | Andersson | 251/5 X    |

FOREIGN PATENT DOCUMENTS

| 2507737 | 12/1982 | France         | 138/93 |
| 1391304 | 4/1975  | United Kingdom | 251/5  |

*Primary Examiner*—Martin P. Schwadron
*Assistant Examiner*—Sheri Novack
*Attorney, Agent, or Firm*—Birch, Stewart, Kolasch & Birch

[57] ABSTRACT

A multiple vessel cascade gas enrichment diaphragm valve/hollow gas-conducting tube combination is provided to control the flow of gas, which combination is particularly useful in an adsorber. The combination includes a capped hollow core connected at only one area to the hollow, gas-conducting tube, the capped, hollow core being provided with one or more perforations through the wall thereof and with a pair of longitudinally spaced-apart annular protrusions, one on each longitudinal side of the perforations. A molded cylindrical tubular elastomeric diaphragm is secured concentrically to the hollow core at the annular protrusions. The diaphragm has walls adjacent the secured ends thereof which are thicker internally than the walls at the region of the perforations, so as to maintain the outer cylindrical tubular shape of the diaphragm. The thicker internal walls each are provided with a pair of longitudinally spaced-apart abutments. The diaphragm thereby provides an annular flow path for gas between the outside walls of the diaphragm and the inner walls of the hollow, gas-conducting tube to permit the flow of gas therethrough. An annular encircling band surrounds the diaphragm at the annular protrusions, with each pair of longitudinally spaced-apart abutments being disposed on either side of an associated protrusion, the band being radially spaced from the inner walls of the gas-conducting tube. This urges the diaphragm against the protrusions. Gaseous pressure is supplied to the interior of the capped hollow core. When the gaseous pressure is applied, this serves to expand the diaphragm radially outwardly so that its outside walls are urged into sealing engagement with the inner walls of the hollow gas conducting tube, to stop the flow of gas therethrough.

4 Claims, 13 Drawing Figures

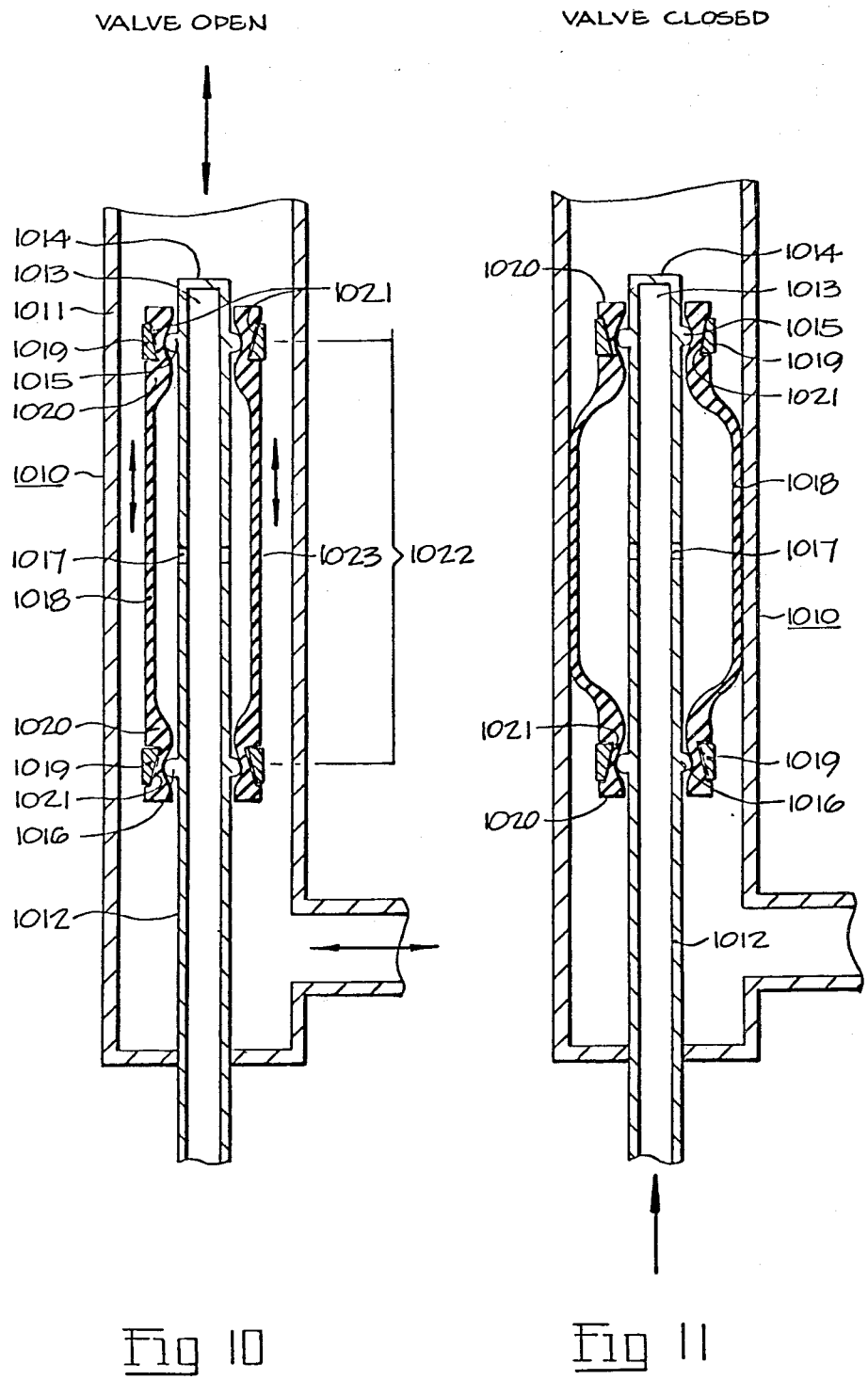

DIAPHRAGM VALVE FOR MULTIPLE VESSEL CASCADE GAS ENRICHMENT SYSTEM

This application is a divisional of copending application Ser. No. 107,860, filed on Dec. 28, 1979 now U.S. Pat. No. 4,321,069.

BACKGROUND OF THE INVENTION (i) Field of the Invention

This invention relates to a diaphragm valve which is particularly useful to to a process, a system and an apparatus for the separation of a mixture of gases and vapors into its constituent components. One specific adaptation of this invention relates to the separation and recovery of oxygen from air. Another specific adaptation of this invention relates to the separation and recovery of hydrogen from a hydrocarbon gas mixture. This invention is a division of application Ser. No. 107,860 filed Dec. 28, 1979, now U.S. Pat. No. 4,321,069.

(ii) Description of the Prior Art

Many processes, systems and apparatuses have been proposed to separate a mixture of gases and vapors into its constituent components. Most involve either complicated procedures or require the use of equipment which is expensive both to assemble and to operate.

In one conventional type of gas-solid or vapor-solid adsorption process, the feed mixture is permitted to enter one end of a packed bed of adsorbent and the desired product is recovered from the opposite end. This process continues for a sufficient period of time, determined by the time when the bed becomes saturated with the more strongly adsorbed components and the product purity begins to deteriorate below acceptable limits. At this point regeneration of the adsorbent is accomplished by reducing the pressure and/or increasing the temperature of the adsorbent and by withdrawing the evolved contaminants from one end or other of the adsorbent bed. The resistance to flow offered by the adsorbent bed over its full length causes the elimination of the contaminants to occur very slowly. The time required for regeneration is often much longer than the time required for adsorption which is usually prohibitively long when a high frequency production-regeneration cycle is desired.

It has been discovered that, when a mixture of two or more gases or vapors is permitted to pass through a cylindrical column packed with an adsorbent which possesses a high affinity toward at least one of the components in the mixture, for some significant period of time, the effluent from the column is relatively free of the more strongly adsorbed components. Moreover, saturation of the adsorbent by these components proceeds in a rather peculiar fashion. A early defined interface is established between the saturated and unsaturated regions in the column, and this interface moves progressively through the column until complete saturation is achieved and the strong adsorbed components suddenly emerge as contaminants in the effluent product. The concentration of these contaminants then quickly increases to the level obtaining in the feed mixture. Prior to this point, operation must be terminated and the adsorbent must be regenerated in preparation for another production cycle.

A thorough examination of the behaviour of adsorbers reveals that, regardless of the particular separation process involved, certain desirable features of geometry and mode of operation can be identified. Thus, it is most advantageous to provide:

1. An adsorbent which possesses a high capacity for the adsorbate (the strongly adsorbed component) to enhance both the quality and quantity of recovered effluent product.
2. A long time period before breakthrough of the contaminating component to increase the period of the cycle and permit sufficient time for regeneration of the saturated adsorber.
3. A minimum adsorption column cross-section to afford a uniform feed distribution and, hence, to minimize channelling of the contaminant through the column.
4. A high feed flow rate to improve the rate of mass transfer between the mixture and the adsorbent.
5. An adsorbent with a maximum tolerance for high concentrations of adsorbate in the feed.
6. A very small residual of the strongly adsorbed gas remaining on the adsorbent at the end of the regeneration portion of the cycle.
7. A rapid rate of regeneration of the adsorbent to minimize the non-productive portion of the cycle.
8. A geometry which permits a low pressure gradient across the adsorbent during regeneration in order to conserve energy.

While it is desirable to achieve these ends, this has not, in fact, been possible heretofore. It has not been possible, heretofore, to devise a simple geometry which permits the attainment of all of these objectives simulaneously. The first four, which pertain to the adsorption phase of the cycle, are favoured by a long column of minimum cross-section. The fifth is a function only of the properties of the adsorbent and gas mixture involved, and is unaffected by geometry. The sixth normally depends upon the period and type of regeneration and, in the case of vacuum regeneration, the residue decreases logarithmically with time. The last two, which pertain to the regeneration phase of the cycle, are improved by a reduction in length and an increase in cross-section of the column. Further, in this connection, it is noted that the time required for regeneration of a specified volume of adsorbent through application of a vacuum at either end of the adsorption column varies in a parabolic fashion with the length of the column. Clearly, regeneration of adsorbers of even modest length by this technique could require several hours.

One attempt to solve the problems noted above was suggested in Canadian Pat. No. 986,424 issued Mar. 30, 1976 to Robert A. Ritter and David G. Turnbull. In that patent, the improvement comprised passing the gas mixture, while under a positive pressure condition of up to 60 p.s.i.g. through a first adsorption zone containing an adsorbent material which is more selective to one gas than to another gas in that gaseous mixture, the adsorption zone also including a primary inlet means and a primary outlet means. The gas mixture was thus caused to travel a relatively long adsorption path from the inlet, through the adsorbent and out the primary outlet. By this means the gas which was more strongly adsorbed was retained in the adsorption zone and gas which was less strongly adsorbed by the adsorbent was withdrawn from the adsorption zone through a primary outlet zone which was substantially free of adsorbent material. The adsorbent was then regenerated and the more strongly adsorbed gas was removed from the adsorbent by the application of a subatmospheric pressure to the adsorbent in the adsorption zone through a distinct zone, a secondary outlet zone which was substantially free of adsorbent material. In this way, the desorbed gas travelled a relatively short, direct desorption path from the adsorbent to the distinct zone which was under subatmospheric pressure and then was removed through a secondary outlet connected to the subpressure distinct zone.

The above-identified Canadian Pat. No. 986,424 also provided an improved adsorption-desorption system for selectively separating one gas from a mixture of gases. The system comprised compressor means for subjecting the mixture of gases to superatmospheric pressure. First storage means were provided which were operatively connected to the compressor means for temporarily storing the mixture of gases under pressure. A first pair of adsorption-desorption vessels was provided which was operatively connected to the storage means by gas inlet lines. Each vessel included an adsorption zone, primary inlet means to the adsorption zone, primary outlet means from the adsorption zone, secondary inlet means to the adsorption zone, secondary outlet means from the adsorption zone, and valve means actuatable selectively to open one only of the primary inlet means and the primary outlet means, or the secondary inlet means and the secondary outlet means. Primary gas withdrawl lines were provided leading from the primary outlet means of each vessel of the first pair of adsorption-desorption vessels. Similarly, secondary gas discharge lines were provided leading from the secondary outlet means of each vessel of the first pair of adsorption-desorption vessels to a source of subatmospheric pressure. Finally, control means were provided for cyclically and alternately operating one adsorption-desorption vessel under adsorption conditions, where its primary inlet and outlet were functional.

The above-identified Canadian Pat. No. 986,424 also provided an apparatus for separating one gas from at least one other gas in a mixture of gases. The apparatus included a main chamber which was adapted to contain adsorbent material. The chamber was provided with perforated walls (e.g., rigid perforated tubes) within the chamber and elastomeric diaphragms were associated with the perforated walls or the rigid perforated tubes. A primary inlet means was provided to the chamber and also a secondary inlet means was also provided, and alternative primary and secondary outlet means were provided from the main chamber. The primary inlet and outlet means were disposed at intervals throughout the adsorbent bed and were arranged such that the feed gas mixture, in moving from the inlet to the outlet, must travel a relatively long path through the adsorbent bed while the secondary outlet means was interconnected to the perforated walls, i.e., the perforated tube structures. Pressure means were provided which were selectively actuatable to urge the diaphragm into engagement with the perforated wall structure to provide an unperforated combined structure.

That above-identified Canadian Pat. No. 986,424 also provided a diaphragm valve. The valve included a hollow casing provided with main gas inlet and gas outlet ports. A hollow sleeve was disposed within the casing, this hollow sleeve including gas impermeable sealed ends and a central portion which was gas permeable or perforated or slotted. A pair of perforated members were disposed one at each end of the hollow sleeve member, and these members extended outwardly from the hollow sleeve member to the interior wall of the hollow casing. An elastomeric tubular diaphragm was secured to the ends of the sleeve and enveloped the central zone of the sleeve. The interior of the sleeve communicated to a source of a pressure fluid so that when the fluid pressure was applied, the diaphragm expanded to come into sealing engagement with the perforated members so as to provide a combined unperforated member. By these means, no gas flowed between the gas inlet and gas outlet ports. Releasing the pressure permitted gas flow between the inlet and outlet ports.

While the above-identified Canadian Pat. No. 986,424 was partially effective in solving some of the problems outlined above, certain other deficiencies were encountered due to the configuration in which the desorption elements comprised perforated tubes disposed within and extending the length of the adsorbent bed. The tubes enclosed full length diaphragm valves which, when expanded, closed the perforations and isolated the vacuum system from the bed. The presence of these long, relatively large diameter diaphragm in the desorption tubes represented a significant resistance to flow of desorbed adsorbate, especially at low absolute pressures, and, hence, tended to increase the pump downtime. Moreover, the frequency cyclical engagement of the diaphragm with the perforations in the tube wall caused excessive wear of the diaphragm and necessitated special treatment of the circumferential inner edge of the perforations. Finally, appreciable quantities of air were required to operate the large diaphragm. As a result, diaphragm expansion was slower and compressor capacity was needlessly consumed.

Other proposals of this type of gas separation and/or purificatiion are taught in the following patents:

| | | |
|---|---|---|
| German Patent No. | 453,887, | December 20, 1927 |
| German Patent No. | 578,485, | June 14,1933 |
| U.S. Pat. No. | 2,254,799, | September 2, 1941 |
| U.S. Pat. No. | 3,141,748, | July 21, 1964 |
| U.S. Pat. No. | 3,242,651, | March 29, 1966 |
| U.S. Pat. No. | 3,430,418, | March 4, 1969 |
| U.S. Pat. No. | 3,533,221, | October 13, 1970 |
| U.S. Pat. No. | 3,619,984, | November 16, 1971 |
| U.S. Pat. No. | 3,719,025, | March 6, 1973 |
| U.S. Pat. No. | 3,923,477, | December 2, 1975 |
| U.S. Pat. No. | 3,957,463, | May 18, 1976 |
| U.S. Pat. No. | 3,977,845, | August 31, 1976 |
| U.S. Pat. No. | 4,070,164, | January 24, 1978 |
| U.S. Pat. No. | 2,075,036, | March 1937 |
| U.S. Pat. No. | 3,080,219, | March 1963 |
| U.S. Pat. No. | 3,085,379, | April 1963 |
| U.S. Pat. No. | 3,140,931, | July 1964 |
| U.S. Pat. No. | 3,432,995, | March 1969. |

In spite of the teachings of the above patents, the problem still exits of efficient adsorption and subsequent efficient desorption by significantly decreasing the time for regeneration of the adsorbent. In addition the problem also exists of providing a diaphragm valve which does not needlessly consume compression capacity.

SUMMARY OF THE INVENTION (i) Aims of the Invention

An object, then, of this invention is to provide a rapidly acting diaphragm valve for use in a simple process, system and apparatus which may be employed in a multitude of situations where the separation, purification, and/or concentration of gaseous mixtures is desired.

Another object of this invention is to provide a rapidly acting diaphragm valve for use in a process, system and apparatus whereby a gaseous mixture may be separated into a series of effluent product streams, in which at least one such stream is rich in one component portion of the gaseous mixture supplied as a feed material.

Yet another object of this invention is to provide a rapidly acting diaphragm valve for use in a process, system and apparatus whereby oxygen-rich products may be recovered from atmospheric air without the use of liquefaction procedures.

Still another object of this invention is to provide a rapidly acting diaphragm valve for use in a process, system and apparatus whereby one gas, e.g., hydrogen, may be recovered from a natural gas mixture without the need for complicated liquefaction procedures.

A still further object of this invention is to provide a rapidly acting diaphragm valve for use in such a process, system and apparatus whereby relatively small amounts of adsorbent material are required, and whereby, consequently, expenditures for equipment may be reduced.

(ii) Statements of the Invention

By this invention a rapidly acting diaphragm valve has been devised for use in, an adsorption system in which, first, the adsorber geometry could be varied to suit all phases of the operating cycle and, second, the cascading of adsorbers significantly descreased the time required for regeneration by increasing the tolerance for residual adsorbate on the major portion of the adsorbent.

By this invention, then, there is provided, in combination, a diaphragm valve and a hollow, gas-conducting tube to control the flow of gas therethrough comprising: (1) a capped hollow core connected at only one area to the hollow, gas-conducting tube, the capped, hollow core being provided with at least one perforation through the wall thereof and with a pair of longitudinally spaced-apart annular protrusions, one on each longitudinal side of the at least one perforation; (2) a molded cylindrical tubular elastomeric diaphragm secured concentrically to the hollow core at the annular protrusions which protrusions comprise a pair of spaced-apart locations on either side of the at least one perforation, the diaphragm having walls adjacent the secured ends thereof which are thicker internally than the walls at the region of at least one perforation, so as to maintain the outer cylindrical tubular shape of the diaphragm, the thicker internal walls each being provided with a pair of longitudinally spaced-apart abutments, the diaphragm thereby providing an annular flow path for gas between the outside walls of the diaphragm and the inner walls of the hollow, gas-conducting tube to permit the flow of gas therethrough; (3) an annular encircling band surrounding the diaphragm at the annular protrusions, with each pair of longitudinally spaced-apart abutments being disposed on either side of an associated protrusion, the band being radially spaced from the inner walls of the gas-conducting tube, whereby to urge the diaphragm against the protrusions; applying gaseous pressure to the interior of the capped hollow core; thereby (5) to expand the diaphragm radially outwardly so that its outside walls are in sealing engagement with the inner walls of the hollow gas conducting tube to stop the flow of gas therethrough.

(iii) Other Features of the Invention

By a further feature of this invention represented by the first multiple vessel cascade gas enrichment system and by the second multiple vessel cascade gas enrichment system of this invention there is also included (E) means for temporarily storing said withdrawn enriched gas; and (F) means for selectively either recycling said stored withdrawn gas for use as all or a part of said gaseous mixture fed by means (B) or for recovering said stored withdrawn gas.

By a further feature thereof, there is included, in each such adsorber of the set, (7) a cycle gas temporary gas storage vessel connected to said product outflow line; (E) means for temporarily storing said withdrawn enriched gas in said storage vessel (7); and (F) means for selectively recycling said temporarily stored withdrawn gas for use as all or part of said gaseous mixture fed by means (B).

By one feature of the diaphragm valve of this invention, the hollow core is provided with a plurality of perforations.

By another feature, the annular encircling band comprises tapered rings.

By a still further feature, the diaphragm is formed from butyl rubber.

BRIEF DESCRIPTION OF THE DRAWINGS

In the accompanying drawings,

FIG. 10 is a central vertical section of a diaphragm valve employing a diaphragm valve of an embodiment of an embodiment of this invention, in its "open" configuration;

FIG. 11 is a central vertical section of the diaphragm valve of FIG. 10, in its "closed" configuration;

Figure 1:
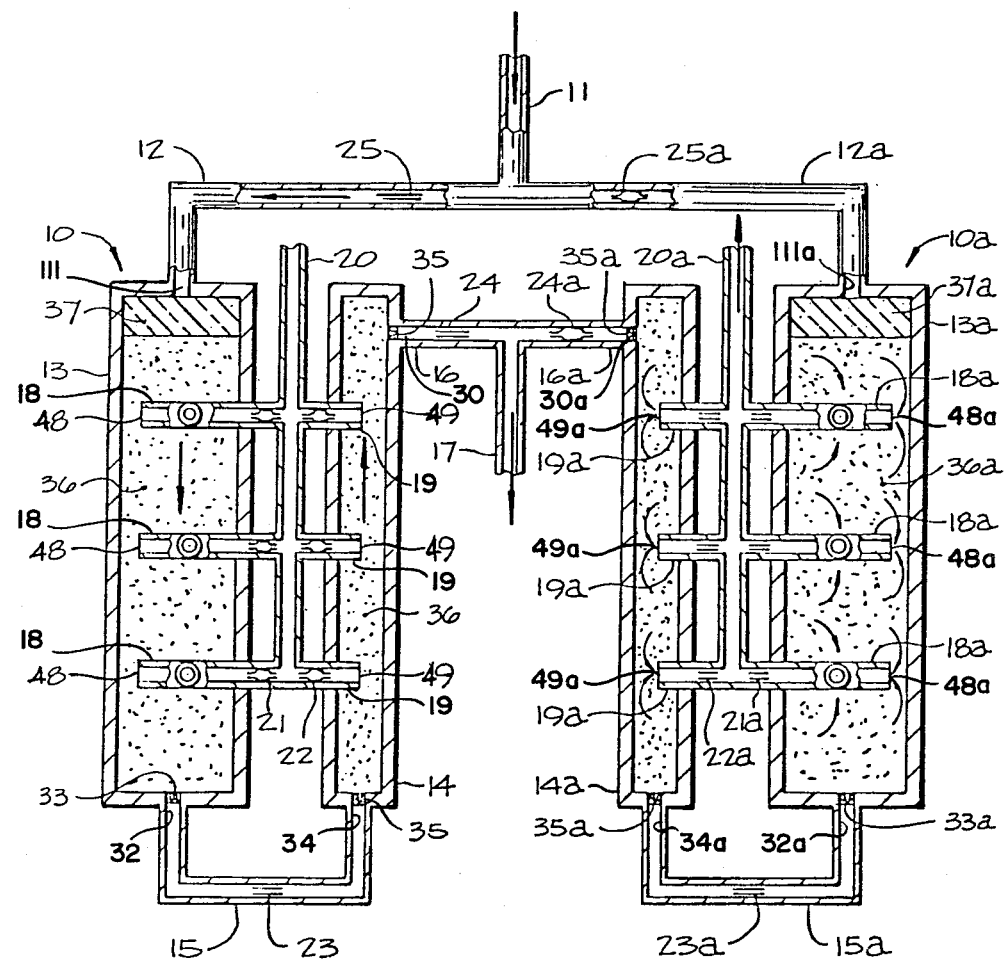
FIG. 1 is a schematic representation of a multiple vessel cascade gas enrichment system set employing a diaphragm valve of an embodiment of this invention.

DESCRIPTION OF EMBODIMENTS (i) Description of First Multiple Vessel Cascade Gas Enrichment System of FIG. 1

As seen in FIG. 1, the gas enrichment system includes a pair of cascaded adsorption vessel sets 10, 10a, each vessel set containing a suitable adsorbent material 36, 36a. As shown, set 10 is in its adsorption phase, while set 10a is in its regeneration phase.

A main gas infeed line 11 bufurcates in two infeed lines 12, 12a leading through valves 25, 25a to primary vessel 13 of set 10 and to primary vessel 13a or set 10a. Since set 10 is in its adsorption phase, valve 25 is shown in its open condition and conversely, since set 10a is in its regeneration phase, valve 25a is shown in its closed condition. Primary vessels 13, 13a are connected to secondary vessels 14, 14a by interstage loop line 15, 15a, respectively. Product is withdrawn from secondary vessel 14, 14a by product withdrawal line 16, 16a, respectively, joining to a common product outflow line 17. Interstage loop lines 15, 15a are each provided with back pressure regulators, e.g., diaphragm valves 23, 23a, according to this invention preferably of a construction to be described hereinafter. Valves 23 and 23a are each shown in an open condition. Lines 16, 16a are likewise provided with back pressure regulators and non-return valves 24, 24a, preferably of a construction to be described hereinafter. To enable sets 10 and 10a to function in the manner specified, valve 24 is shown in its open condition, while valve 24a is shown in its closed condition.

Primary vessel 13, 13a and secondary vessel 14, 14a are each provided with secondary outlet means defined by a plurality of vertically spaced-apart, horizontally disposed collector means, namely primary gas collectors 18, 18a within primary vessel 13, 13a, respectively, and secondary gas collectors 19, 19a within secondary vessels 14, 14a, respectively. The inlets to primary gas collector means 18, 18a are provided with screens 48, 48a, and similarly the inlets to secondary gas collector means 19, 19a are provided with screens 49, 49a. Collector means 18, 19 are interconnected to vertical evacuation tube 20, and collector means 18a, 19a are similarly interconnected to vertical evacuation tube 20a, each evacuation tube 20, 20a being connected to a source of vacuum (not shown). Primary gas collector means 18, 18a are provided with a plurality of suitable valves, e.g., diaphragm valves 21, 21a, according to this invention respectively, while secondary gas collector means 19, 19a are likewise provided with a plurality of suitble valves, e.g., diaphragm valves 22, 22a, according to this invention respectively. To enable sets 10 and 10a to function in the manner specified, valves 21, 22 are shown in their closed condition, and valves 21a, 22a, are shown in their open condition. The diaphragm valves 21, 21a, 22, 22a are preferably of a structure according to this invention to be described hereinafter with reference to FIGS. 10 and 11.

Each vessel 13, 14 of set 10 is substantially filled with a suitable adsorbent material 36 and each vessel 13a, 14a of set 10a is also substantially filled with a suitable adsorbent material 36a. Vessels 13, 13a are provided with porous hold-down means 37, 37a at inlet apertures 111, 111a in order to prevent desruption of the adsorbent material 36, 36a during use. Vessels 13, 13a are provided with porous plugs 33, 33a at outlet apertures 32, 32a to retain the adsorbent material 36, 36a within the vessel. In addition, the inlet apertures 34, 34a and outlet apertures 30, 30a and of vessels 14, 14a are each provided with porous plugs 35, 35a, to retain the adsorbent 36, 36a in the respective vessels.

Thus, as noted above, each adsorption vessel or each set is provided with a collector means located within the columns. These collector means are opened or closed by associated tubular diaphragm valves during regeneration or production in each adsorber set. During the production phase of the cycle with the diaphragm valve associated with the infeed line retracted, i.e., open, and with the diaphragm of the associated diaphragm valve operatively associated with the respective collector means expanded, i.e., closed, and with the ports to the associated evacuation tube sealed, as shown by the left hand column set shown in FIG. 1, the adsorption vessel appears to the incoming feed air as a column of ideal length. At the same time, the right hand vessel set shown in FIG. 1, undergoing regeneration, appears to the vacuum system as an adsorber of very short bed depth since the diaphragm valves associated with the infeed line are expanded, i.e., closed, and with the diaphragm valves associated with the collector means are retracted, i.e., are closed, and the ports to the evacuation tube are open.

(ii) Operation of Embodiment of FIG. 1

In operation, dry air at atmospheric pressure is permitted to enter the first adsorber set. When equilibrium is achieved, compressed air, for example, at 15 to 60 psi pressure, is introduced into the first adsorber set, and the enriched oxygen product is withdrawn from outlet tube 17. During the same period, the second adsorber set is being regenerated with the aid of a vacuum pump. The time required for a complete cycle of operation may vary from a few seconds to several minutes. Since the process is cyclic in nature and the oxygen production rate varies with time, a storage vessel is preferred in order effectively to smooth the flow of product at the outlet. A control system is responsible for the overall supervision of the process and the proper sequencing of the various functions in a fully automatic fashion and essentially without operator intervention. The control system determines the status of all the diaphragm valves into and out of the system and establishes the absolute and relative vacuum levels of each vessel of the adsorber set during regeneration. Thus, in the early stages of regeneration of a particular adsorber set, all diaphragm valves associated with the collector means in all vessels are open. Then, at a predetermined vacuum level, the diaphragm valves associated with the collector means in the first stage vessel are closed. The vacuum is thus applied only to the second (and subsequent) stage vessels to regenerate such second (and subsequent) stage vessels. This sequential shutting down of the diaphragm valves in the preceding stage vessel is repeated for each subsequent stage vessel until the evacuation phase of the cycle is essentially completed.

An important feature is related to the use of cascaded adsorption vessels which significantly increases the tolerance for adsorbate residuals in a major, or substantial, portion of the adsorbent and hence reduce the time and energy required for regeneration. During vacuum regeneration, the rate of adsorbate removal decreases approximately logarithmically with time. Consequently, a disproportionate amount of pumping energy is consumed for removal of residual quantities of adsorbate at low pressures. Although the quantity of adsorbate comprising the residual may not be significant from the point of view of reduction in adsorbent capacity, this material is efficiently eluted from the adsorbent during the subsequent production stage of the cycle and could seriously contaminate the product. Thus, through use of a cascade arrangement consisting of a large adsorption vessel followed by one or more smaller vessels, it is possible to operate with the major portion of the adsorbent at a relatively high adsorbate residual after regeneration (poor vacuum, e.g., from 25 to 150 mm Hg absolute pressure) and to remove the eluted from the adsorbent contaminant in the secondary chamber in which regeneration is substantially more complete (higher vacuum, e.g., from 2 to 30 mm Hg absolute pressure). The volume of the secondary vessel is 5% to 30% of the volume of the primary vessel for best performance. The optimum size ratio depends upon operating conditions such as pumpdown pressure and production pressure in each vessel. In one instance, optimum performance was achieved when the volume of the secondary (i.e., subsequent stage) vessel was between 5% and 30%, e.g., 15%, of the volume of the primary (i.e., the first stage) vessel. The net result of this process configuration and operating procedure is an increase of at least 60% to 100% in the production capacity of the system when compared to a conventional vacuum regenerated adsorption system of similar size and energy consumption.

(iii) Description of Multiple Vessel Cascade Gas Enrichment Adsorber of FIGS. 2, 3, 4 and 5

Figure 2:
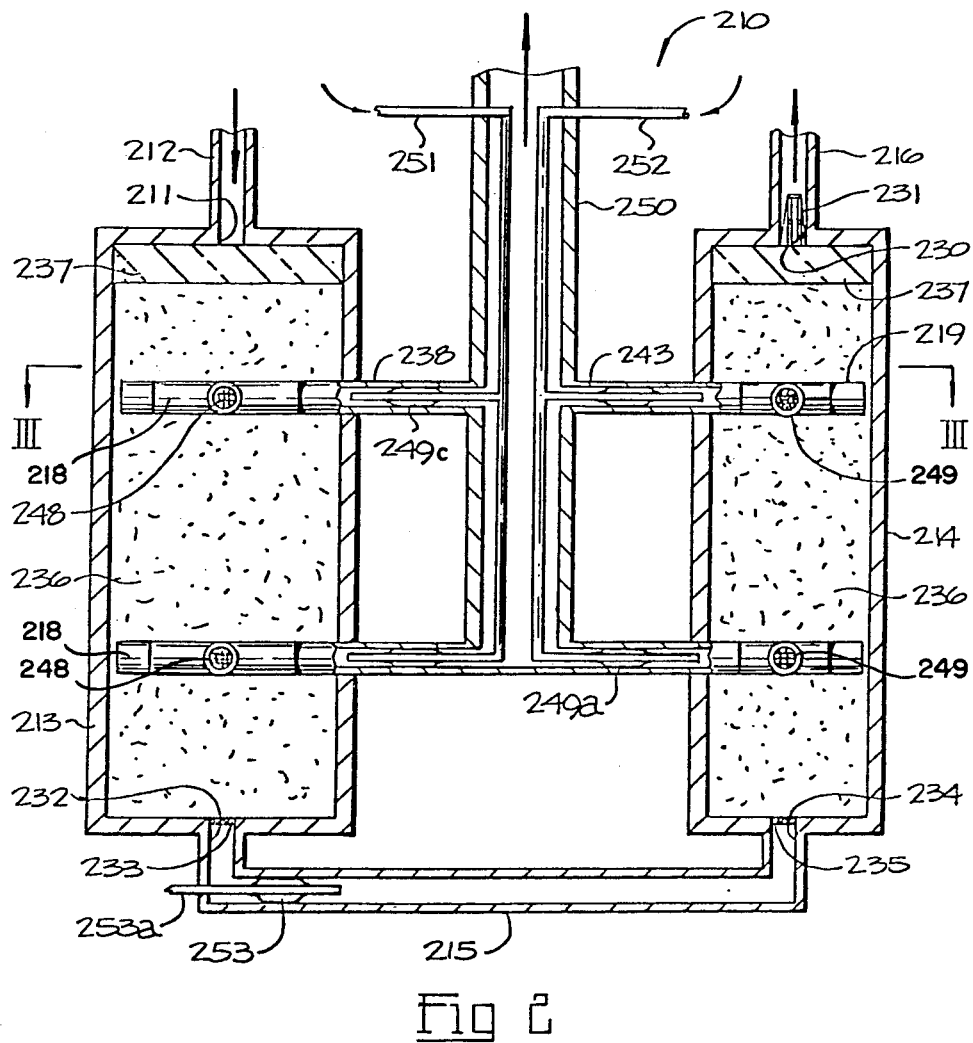
FIG. 2 is a central vertical section of a two-vessel cascade gas enrichment adsorber employing a diaphragm valve of an embodiment of this invention.
Figure 3:
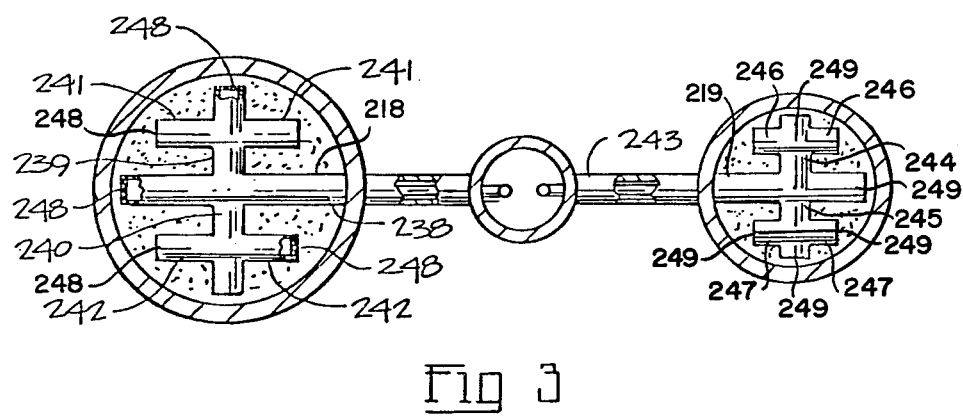
FIG. 3 is a cross-section along the line III—III of FIG. 2.

As seen in FIGS. 2 and 3, the two-vessel cascade adsorber 210 includes a cylindrical primary vessel 213 including an infeed aperture 211 connected to an infeed tube 212, and a secondary vessel 214 connected to the primary vessel 213 by an interstage loop 215 and discharging product through aperture 230 leading to product outflow tube 216. Product outflow tube 216 is provided with a pressure regulator and non-return valve 231, one example of which will be described hereinafter. Outflow aperture 232 from the first vessel 213 to interstage loop 215 is provided with adsorbent retainer 233, while inflow aperture 234 to second vessel 214 from interstage loop 215 is also provided with an adsorbent retainer 235. Each vessel 213, 214 is filled with a suitable adsorbent 236, which is retained in plate by adsorbent retainer 237. Adsorbent is prevented by entering interstage loop 215 from vessels 213, 214 by means of porous plugs 232, 234 respectively. Secondary vessel 214 is provided with a back pressure regulator and non return valve 231 in the product outflow tube 216 which preferably is the valve described in FIG. 9.

Disposed in vertically spaced-apart horizontal orientation within primary vessel 213 and secondary vessel 214 are collector means in the form of a plurality of tubular grid arrangements 218, 219, respectively. As seen more clearly in FIG. 3, grid arrangement 218 includes a main hollow tube 238, which leads to secondary hollow tubes 239, 240, which in turn lead to tertiary hollow tubes 241, 242. Similarly, grid arrangement 219 includes main hollow tube 243, which may lead to secondary hollow tube 244, 245, which in turn may lead to tertiary hollow tubes 246, 247. The free ends of hollow tubes 238-242 and 244 are each capped with adsorbent-excluding devices, e.g., screens 248. The purpose of this pattern of the grid arrangement is to shorten the desorption path in the adsorbent 236.

Associated with each main hollow tube 238, 243 are diaphragm valves 249c, 249d according to this invention one embodiment of whose construction will be described hereinafter. Valves 249c, 249d are shown in their closed condition. Main hollow tubes 238, 243 are interconnected to a main hollow vertical shaft 250, connected to a source of vacuum. Diaphragm valves 249c, 249d are each connected to respective valve control lines 251, 252. Also disposed within interstage loop 215 is an interstage back pressure regulator, which may be a diaphragm valve 253 according to this invention. Diaphragm valve 253 is shown in its closed condition. A control line 253a is also provided for this valve 253.

It will be observed that, if valves 253 and 231 are in their open condition and valves 249c, 249d are in their closed condition, gas flows in the direction of the arrow in infeed tube 212 and out through product outflow tube 216. On the other hand, when valves 253 and 231, in their closed condition and valves 249c, 249d are open, gas flows in main hollow tubes 238, 243 and out main hollow vertical shaft 250, as shown by the arrow.

Figure 4:
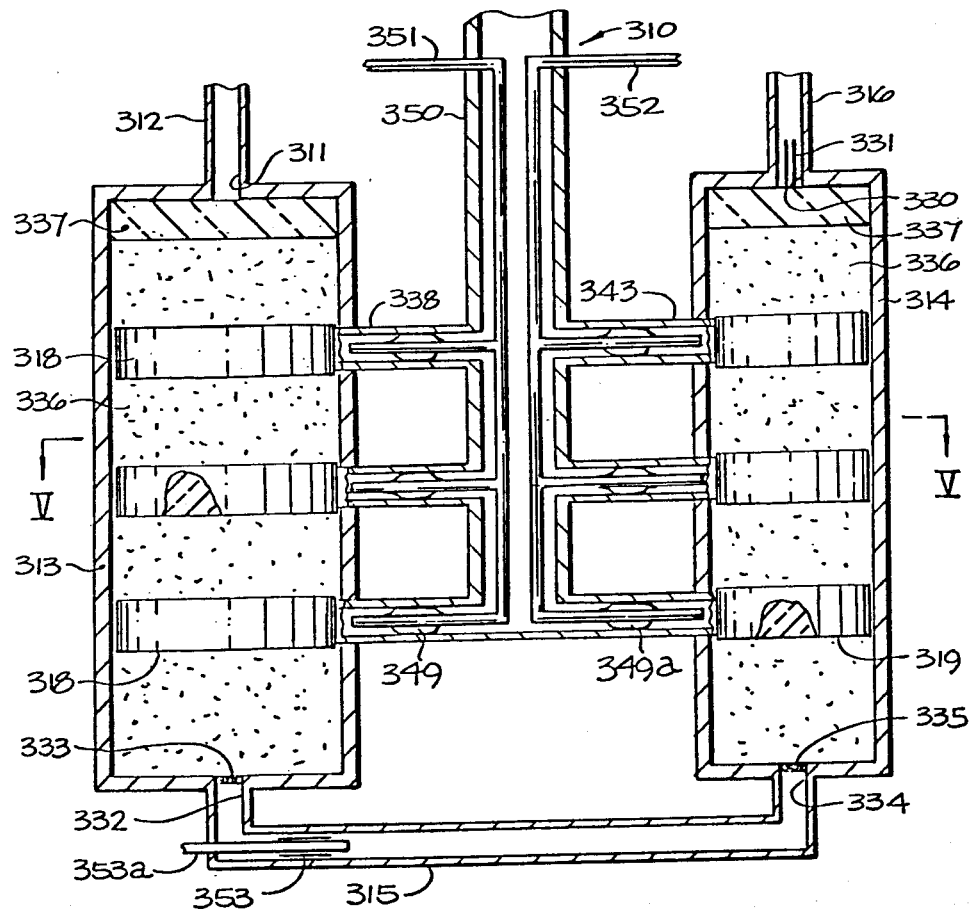
FIG. 4 is a central vertical section of a two-vessel cascade gas enrichment adsorber employing a diaphragm valve of an embodiment of this invention.
Figure 5:
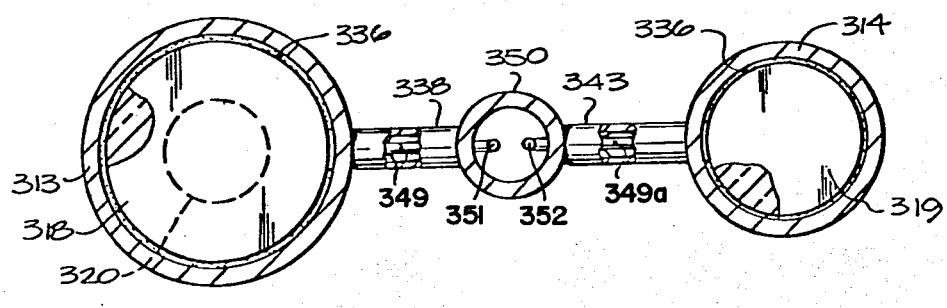
FIG. 5 is a cross-section along the line V—V of FIG. 4.

FIGS. 4 and 5 show an alternative embodiment 310 of the two-vessel-cascade adsorber 210 of FIGS. 2 and 3, in which all elements are the same and are thus identified by a "300" series number rather than a "200" series number as in FIGS. 2 and 3 except for the collector means which are in the form of a plurality of rigid, highly permeable foamed glass or plastic members 318, 319, in the form of a disc, toroid or similar shape. As shown in FIG. 5, the member 318 includes an optional central opening 320 therein, so that the member is in the form of a torus. This provides a suitable collector for larger adsorber vessels. Each disc 318, 319 is horizontally disposed, is of approximately the same diameter as the interior of the vessel 213, 214 but slightly less than that diameter and is placed adjacent to one of the secondary outlet ports employed for regeneration of the adsorbent. Since the fluid conductance of the foam is extremely high even at high vacuum, the disc provides communication with the adsorbent bed which is similar to that provided by the grid, and, thereby, effectively shortens the bed length during desorption.

The collectors 318, 319 are each associated wwith diaphragm valves in the same manner as collectors 218, 219 previously described with reference to FIGS. 2 and 3. Primary vessel 313 is provided with porous hold-down means 337 and porous plug 333 within outlet 332 to retain the suitable adsorbent material 336 therewithin. Similarly secondary vessel 314 is provided with porous hold-down means 337 and porous plug 335 in inlet 334 to retain the suitable adsorbent material 336 therewithin. Outlet 316 from vessel 314 is provided with a back-pressure regulator and non-retain valve 331. Valve 353, controlled by valve control line 353a is shown in its open condition, while valves 349, 349a, controlled by valve control lines 351, 352 respectively are shown in their closed condition.

(iv) Operation of Embodiments of FIGS. 2, 3, 4 and 5

Thus, as described hereinabove for FIGS. 2, 3, 4 and 5, the two vessels involved are preferably cylindrical, each having a length-to-diameter ratio of at least 2. The volume ratio decreases from the first to the subsequent stages. The specific volume ratios would depend upon the intended process operating conditions. As the pumpdown pressure in the first stage vessel includes, or as the process operating pressure increases, the volume ratio between the first and subsequent stage vessels decreases.

The two vessels are provided with adsorbent of a type which is appropriate for the specific gas mixture to be separated. For example, the separation of oxygen from nitrogen is readily accomplished with the aid of 5A molecular sieve.

To minimize attrition of the adsorbent during operation of the process, the vessels should be packed to a high density and any free volume which subsequently develops as a result of settling should be accommodated by some expandable device, e.g., a spring-loaded perforated plate or a highly permeable, flexible formed resin located above and/or below the adsorbent bed.

Each vessel is provided with one or more hollow tubular desorption grids which are horizontally disposed within the adsorbent bed, which are substantially free of adsorbent, and which penetrate the vessel wall at one or more locations to terminate in a vacuum header. Communication between the grid and the header is controlled by means of tubular diaphragm valves to be described later.

The size of the grid, the diameter of tubes in the grid, the number of communication holes, the number of headers and the vertical distance between individual grid structures depends upon the size of the vessel (production capacity of the process) and the maximum allowable desorption path length. This maximum value may vary from about 4 inches to about 20 inches and depends upon such variables as grain size of the adsorbent (shorter for small grain size), and the pumpdown pressure intended (shorter for lower ultimate absolute pressure).

The two vessels in each adsorber set are connected at one end through a suitable back pressure regulator which provides complete vacuum tight shut off until the pressure in the first vessel reaches some predetermined value, e.g., in the range from about 5 psig to about 50 psig. Once open, one function of the regulator is to ensure full the pressure in the first vessel does not decline at any time during the production cycle since this could result in contamination of the product due to some desorption of the adsorbed phase. As the pressure in the first vessel increases, the regulator aperture is progressively enlarged to permit, depending on the pressure gradient, increased flow to the second vessel.

The back pressure regulator valve is placed in the line connecting the two vessels and, in the event that a diaphragm valve is used for this purpose, is actuated with air precisely regulated at a pressure sufficient to expand the diaphragm into sealing engagement with the wall and to maintain this seal until the pressure in the first vessel attains the desired minimum controlled level. At any pressure above this value, the diaphragm will be forced to contract slightly thereby permitting gas to flow into the second vessel. Thereafter, the diaphragm valve will perform as a proportional controller in its response to the pressure in the vessels since any tendency toward an increase in this pressure will cause the diaphragm to contract further and to enlarge the orifice which regulates flow into the second vessel.

The second vessel is similarly provided with a back pressure regulator at the outlet end. This device, which serves essentially the same purpose as that described above, operates at a predetermined pressure of, e.g., about 5 psi to about 30 psi below the pressure in the first vessel. The second vessel is also provided with a non-return valve to prevent back flow of product into the vessel during vacuum regeneration. The two back pressure regulators and non-return valves may be a single valve device which will be described hereinafter.

In order to minimize the rate of deactivation of adsorbent, e.g., 5A molecular sieve, feed gases to the adsorber may require drying to low dew points, e.g., in the range of about $-40°$ F. to about $-60°$ F. The drying operation may be readily accomplished with the aid of numerous commercially available refrigeration or dessicant type driers. Among the latter, the familiar "heatless drier" concept is compatible with the system and exhibits several desirable features such as low capital and energy costs. The heatless drier is especially suited for use with small multiple vessel cascade gas enrichment systems of this invention since it may be advantageously incorporated into the first adsorber vessel structure, thereby substantially reducing capital costs and size and simplifying the process of drier regeneration.

Figure 6:
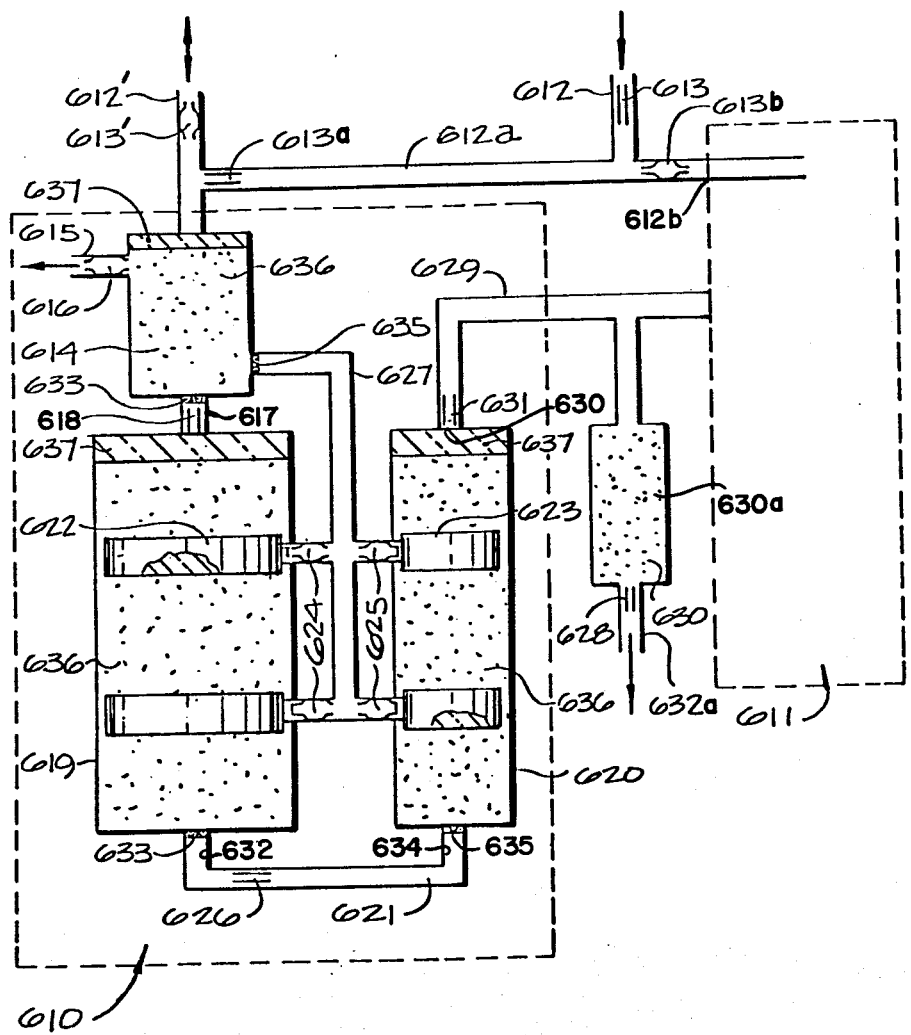
FIG. 6 is a schematic representation of an adsorber system set employing a diaphragm valve of an embodiment of this invention.

(v) Description of Second Multiple Vessel Cascade Gas Enrichment Adsorber System of FIG. 6

A schematic representation of a multiple vessel cascade gas enrichment system is shown in FIG. 6. In FIG. 6, two identical drier and adsorber set combinations 610, 611 are provided, so that one set would be engaged in gas (e.g. oxygen) production, while the other set would be experiencing regeneration, and vice versa. Since sets 610 and 611 are identical, only set 610 has been shown in detail and will be described.

Inlet line 612, having a diaphragm valve controller 613 according to this invention therein leads via branch line 612b to set 611, which is not in its adsorption cycle since valve 613b is closed, and via branch line 612a through open valve 613a to a drier 614. Valve 613 and valve 631 are each shown open. An additional line 612' with valve 613' according to this invention therein also leads alternatively to drier 614. When drying air is led in through line 612', valve 613' is open, and valves 613a, and 613 are closed. Drier 614 has a secondary outlet line 615 leading to a source of vacuum (not shown) and is provided with a diaphragm valve 616 according to this invention, and includes an interconnecting line 617 provided with a diaphragm valve 618 according to this invention leading to primary adsorption vessel 619. Drier 614 is substantially filled with a suitable adsorbent material 636, which is held in place by porous hold-down means 637 and porous plug 633. Primary vessel 619 is substantially filled with a suitable adsorbent material 636, held in place by porous hold-down means 637 and plug 633m at outflow aperture 632. Secondary vessel 620 is substantially filled with suitable adsorbent 636, held in place by porous hold-down means 637 and plug 635 at inflow aperture 634. Primary adsorption vessel 619 is connected to secondary adsorption vessel 620 primarily via interstage loop 621, and by collector means 622, 623, (of a structure as previously described with reference to FIG. 5). Collector means 622 are associated with diaphragm valves 624 according to this invention, while collector means 623 are associated with diaphragm valves 625 according to this invention. Interstage loop 621 is provided with back pressure regulator 626 which is shown in its open condition. Collector means 622, 623 are interconnected to vertical evacuation tube 627 which leads to drier 614. Collector means 622, 623 are preferably highly permeable foamed glass or plastic discs as described in FIGS. 4 and 5. Valves 624, 625 are shown in their closed condition.

Figure 12:
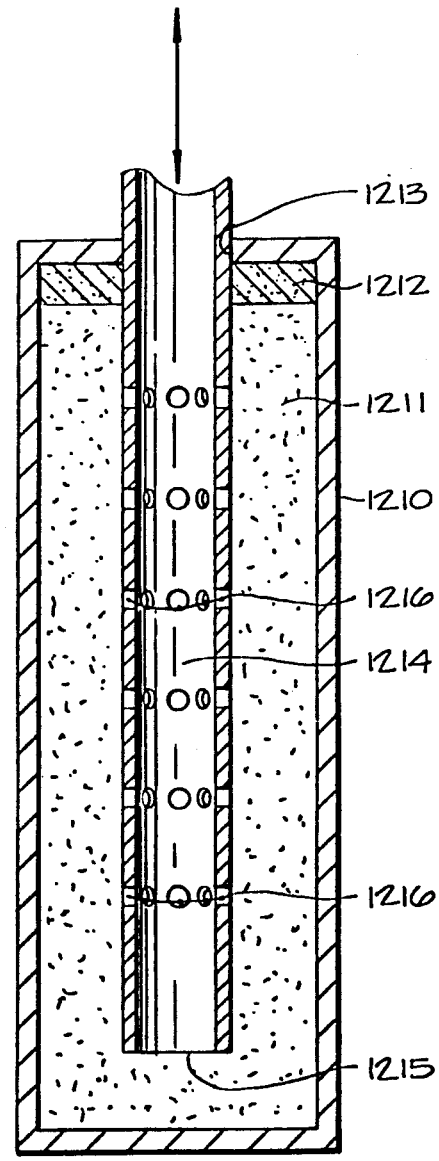
FIG. 12 is a central vertical section of a gas storage vessel.

Second vessel 620 discharges product gas through outlet back pressure regulator and non-return valve 631 which leads, via line 629, to storage vessel 630a, which preferably is of the structure shown in FIG. 12, although somewhat modified by having outlet 632 provided with diaphragm valve 628. Branch line 612b of compressed air inlet line 612 leading to combination 611 is provided with an inlet diaphragm valve 613b according to this invention. Since combination 611 is not in its adsorption phase, valve 613b is shown in its closed condition.

(vi) Operation of Embodiment of FIG. 6

In operation, valve 613', located at the inlet of the previously regenerated adsorber 619, 620 and drier 614, as well as valve 618, located between the drier 614 and the first stage vessel 619, are opened to allow air to flow through the drier 614 to fill the evacuated first stage vessel 619 and to raise the pressure to near atmospheric. All other diaphragm valves in combination 610 are closed at this time. Valve 613' is then closed by activating the associated diaphragm and inlet valves 613 and 613a are opened, thereby supplying compressed dry air to the first stage vessel 619. Within the vessel 619, as that pressure increases, nitrogen, carbon dioxide and most other contaminating gases are strongly adsorbed on the adsorbent while the oxygen and argon are more weakly adsorbed and tend to concentrate in the gas phase. When the pressure in the first stage vessel 619 achieves a level equal to the set point of the intervessel back pressure regulator 626, the enriched oxygen flows into the smaller secondary vessel 620 for further purification. The pressure in the first stage vessel 619 then continues to increase gradually during the remainder of the production cycle, thereby providing additional oxygen feed to the secondary vessel.

Since the regeneration of the secondary vessel is more complete than that of the first vessel 619, virtually all of the nitrogen impurity can be removed from the feed to this vessel to produce an oxygen product of up to about 95% oxygen purity with argon as the major contaminant. This oxygen product begins to emerge from the outlet aperture 630 of the secondary vessel 620 and into line 624 when the gas pressure in the secondary vessel 620 exceeds the set point of the outlet back pressure regulator 631.

When the adsorber set 610 is saturated with nitrogen, as evidenced, for example, by a sudden decrease in oxygen product purity emerging from line 632a through diaphragm valve 628, oxygen production is terminated by closing valves 613a, 618 and 631 and opening valves 624, 625. The compressed gas within the two vessels is thereby permitted to expand through the drier 614 in a reverse flow fashion and to escape to the atmosphere (or to the intake of a compressor if the adsorbed gas is to be retained). The expanding dry gas serves partially to regenerate the drier by purging the adsorbed water from the system.

When the pressure in the first adsorber set 610 decreases to near atmospheric, valve 613' is closed and valve 616 is opened to permit vacuum regeneration of the adsorbent in this portion of the system. All of the desorbed gases are caused to flow through the associated drier 614, thereby effecting final regeneration of this unit as well.

Evacuation of the two vessels 619 and 620 in the first adsorber set 610 is continued until the absolute pressure in the first vessel 619 attains a predetermined value, e.g., in the range from about 25 mm Hg to about 150 mm Hg, at which time the desorption collector means 622 in that vessel is sealed by closing valves 624, and valve 618 is closed. Evacuation of the second vessel is continued until the pressure in that vessel decreases to a lower predetermined value, e.g., in the range from about 2 mm Hg to about 30 mm Hg depending upon the desired purity of the final oxygen product. The desorption grid 623 in the secondary vessel is then sealed by closing valves 625, and valve 616 is closed to isolate the first adsorber set 610 and associated drier 614 from the vacuum system. These adsorber elements are then again available for oxygen production in the succeeding cycle.

In the interest of equipment utilization efficiency, and to maximize the rate of oxygen production, a second identical drier and adsorber set combination 611 is provided. These components are engaged in oxygen production (as described above for combination 610) while the first drier and adsorber set 610 are experiencing regeneration and, conversely, are regenerated during the production period of the first combination 610.

Although the precise timing of the sequence of operations associated with a complete production cycle may assume any one of a number of feasible permutations, a particular policy has been found very satisfactory will now be described for a production/evacuation cycle of about 210 secs. In the first adsorber set 610, in the production period, atmospheric intake takes about 15 sec., compressor feed takes about 30 secs. and atmospheric blowdown takes about 15 secs. Then in the evacuation period, the first stage evacuation takes about 54 secs. and the second stage evacuation takes about 6 secs. Then the production period starts again.

In the second adsorber set, while the first adsorber set is in its production period, the first stage evacuation takes place for about 54 secs. and the second stage evacuation takes place for about 6 secs. Then while the first stage adsorber set is in its evacuation period, the atmospheric intake takes about 15 secs., the compressor feed takes about 30 secs. and the atmospheric blow-down takes about 15 secs. It is to be noted, however, that the normalized relative time periods will be significantly influenced by such factors as vacuum pumps, etc. and are intended for purposes of illustration only.

Oxygen production from the cyclic adsorption process is temporarily stored in a surge vessel, e.g. 630a, at relatively low pressure and may be compressed to any desired final higher pressure with the aid of a suitable compressor. Where desired, the volume of both the low pressure and high pressure storage facility may be reduced by filling each vessel with a suitable adsorbent, e.g., 5A molecular sieve. The storage capacity of the packed vessel at any pressure is thereby increased significantly when compared to an empty vessel of identical volume. The rate of movement of oxygen into and out of the packed vessel is enhanced by the provision of one or more perforated, small diameter tubes which extend through the adsorbent, as illustrated in FIG. 12, and which will be described in greater detail hereinafter.

Figure 7:
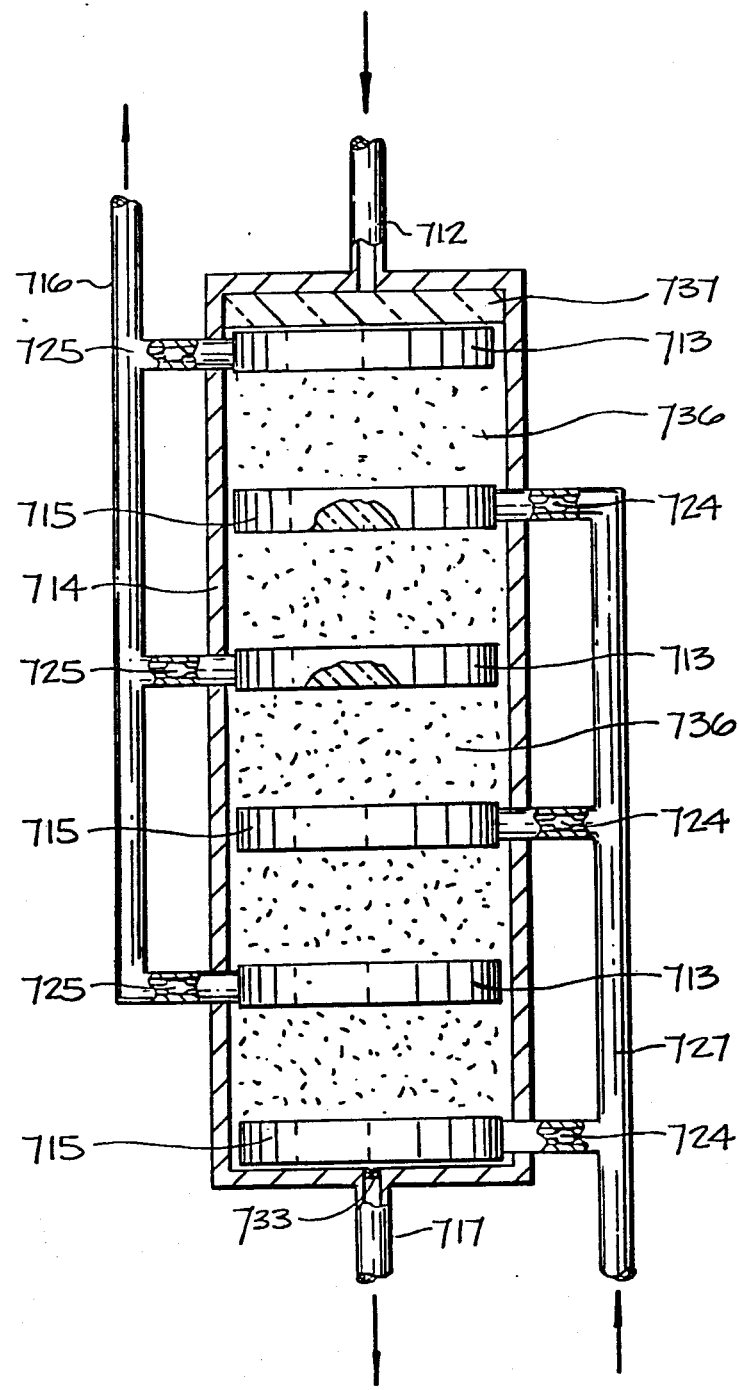
FIG. 7 is a central vertical section of a drier adapted to be used in the adsorber system set of FIG. 6.

(vii) Description of Drier of FIG. 7

FIG. 7 shows a modification of a "no-heat" drier an embodiment of for larger capacity systems requiring a long drier bed length. Regeneration is enhanced by locating highly permeable foamed glass or plastic discs at appropriate intervals throughout the drier bed. Thus, as shown in FIG. 7, the drier 714 is provided with an air infeed line 712 and a dried air outlet line 717 leading to the first stage adsorber set (not shown) for production. The drier is provided with a suitable adsorbent 736 as previously described, between inlet 712 and outlet 717. Adsorbent 736 is maintained in position in vessel 714 by means of porous hold down means 737 and plug 733. Disposed in vertical spaced-apart relation within drier 714 are collector means which may be grid elements (as shown in FIGS. 2 and 3) or, preferably, permeable discs (as shown in FIGS. 4 and 5). One set of such discs 713 is connected, via suitable valves 725 according to this invention, to an exhaust line 716 connected to a source of vacuum (not shown), valves 725 being shown in their closed condition. An alternate set of such discs 715 is connected, via suitable valves 724 according to this invention, also shown in their closed conditions, to a collector line 727 to the adsorber (not shown) for regeneration purposes. Thus, each alternate disc is located adjacent to a secondary bed inlet from the adsorber and a secondary outlet to the vacuum pump. As a result, the path length for moisture removal during drier regeneration is the distance between an inlet and outlet discs and is, therefore, considerably shorter than the length of the adsorber which is involved during gas drying. Consequently, the degree and efficiency of drier regeneration is enhanced.

Figure 8:
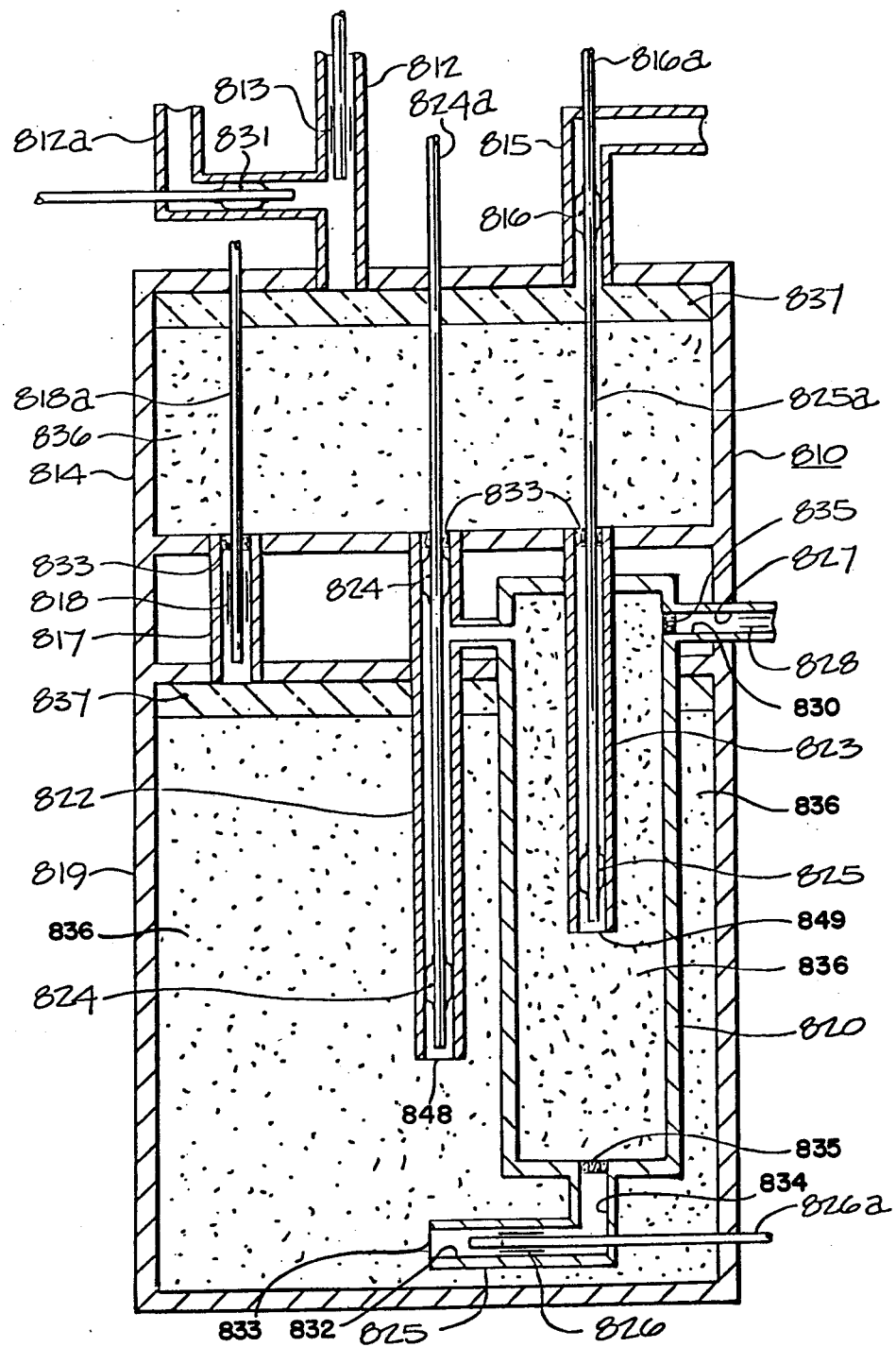
FIG. 8 is a central vertical section of an integrated two-vessel cascade gas enrichment adsorber employing a diaphragm valve of an embodiment of this invention.

(viii) Description of Integrated Multiple Vessel Cascade Gas Enrichment Adsorber of FIG. 8

FIG. 8 shows the compaction of small gas separation systems which can be achieved by locating the second stage vessel inside the first stage vessel according to an embodiment of this invention. This expedient also serves to reduce the necessary piping and valving of the equipment and simplifies its operation. Thus, a main vessel 810 is provided, within which are located suitable interconnected drier vessel 814, primary adsorption vessel 819 and secondary adsorption vessel 820. Inlet to vessel 810 is through main inlet line 812 within which is located diaphragm valve 813 according to this invention shown in its open condition, and a branch line 812a within which is diaphragm valve 831 according to this invention shown in its closed condition. Line 812 leads to drier chamber 814, which connects to primary adsorption vessel 819 through line 817 within which is diaphragm valve 818 according to this invention, controlled by line 818a. Diaphragm valve 818 is shown in its open condition. Drier chamber 814 is substantially filled with suitable adsorbent 836, held in place by porous hold-down means 837 and by porous plugs 833. Primary vessel 819 is provided with vertically disposed collector means 822 (e.g., either grids as in FIGS. 2 and 3 or discs as in FIGS. 4 and 5), the operation of which is actuated by diaphragm valves 824 according to this invention, controlled by line 824A. Diaphragm valves 824 are shown in their closed condition.

Primary adsorption vessel 819 is connected to secondary adsorption vessel 820 via interstage loop 825, having a porous means 833 at the inlet 832 thereof to exclude adsorbent material provided with a back pressure regulator, e.g., diaphragm valve 826 according to this invention controlled by control line 826a. Both primary adsorption vessel 819 and secondary adsorption vessel 820 are filled with adsorbent 836. Diaphragm valve 826 is shown in its open condition. Outlet gases exit from secondary adsorption vessel 820 through outlet aperture 830 having plugs 835 thereon via line 827, within which is back pressure regulator and non-return valve 828 according to this invention, shown in its open condition. Secondary adsorption vessel 820 is also provided with vertically disposed collector means 823 (e.g., either the grids of FIGS. 2 and 3 or the discs of FIGS. 4 and 5), the operation of which is actuated by diaphragm valves 825 according to this invention controlled by line 825a. Valves 825 are shown in their closed condition.

Drier vessel 814 is provided with an outlet line 815, provided with a diaphragm valve 816 according to this invention, controlled by control line 816a.

(ix) Operation of Embodiment of FIG. 8

The operation of this multiple vessel cascade gas evacuation system is identical to that described in the embodiment of FIG. 6 and will not therefore be described further. It is noted that the numbered parts in the description of the operation of the embodiment of FIG. 6 are the same as corresponding parts in FIG. 8, with the exception that the parts in FIG. 6 are designated within the "600"-series, while those in FIG. 8 are designated within the "800"-series.

Figure 9:
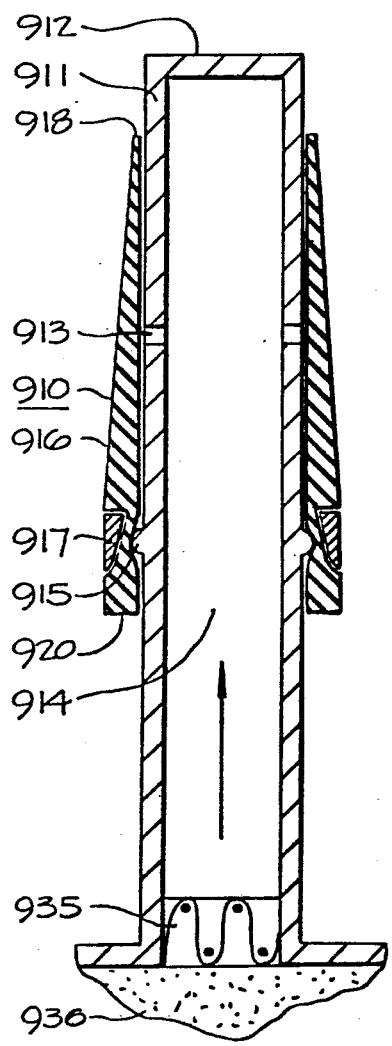
FIG. 9 is a central vertical section of an adjustable back pressure regulator and non-return valve.

(x) Description of Back Pressure Regulator and Non-Return Valve of FIG. 9

FIG. 9 shows a suitable back pressure regulator and non-return valve 910. The device 910 includes a hollow plug 911 having one closed end 912 and one or more perforations 913 through the wall thereof. The wall thereof adjacent the open end 914 is provided with an annular locking projection 915. A tubular diaphragm 916 is disposed over the mid-portion of the hollow plug 911 and is retained thereon by a tapered retaining ring 917. Tubular diaphragm 916 tapers gradually from the top 918 to the bottom 920 thereof so that the wall thickness is different along the length thereof. This permits a simple yet effective back pressure regulator and non-return valve to be provided, as will be described hereinafter.

(xi) Operation of the Embodiment of FIG. 9

As noted above, this very simple device is, nonetheless, capable of performing the dual role of back pressure regulator and non-return valve. The cylindrical hollow plug is closed at one end and is encased in a tightly fitting tubular diaphragm which varies in wall thickness along its length. The diaphragm seals small perforations in the plug wall which communicate with the hollow core. Upon application of sufficient pressure in the core, the diaphragm is caused to expand away from the perforations and to permit an escape of gas through the annulus formed between the diaphragm and the plug. The size of this annulus or annular aperture is determined by the differential pressure across the diaphragm and, consequently, provides a proportional mode of control of the pressure. Adjustment of the pressure to the desired level is achieved by moving the disphragm along the plug, thereby varying the thickness of the diaphragm wall, i.e., the resistance to expansion, of the diaphragm adjacent to the perforation.

The device described above also functions as an effective non-return valve since any tendency toward flow reversal implies a negative pressure gradient between the hollow core and the region surrounding the annulus or annular aperture of the diaphragm and the perforations.

(xii) Description of Diaphragm Valve of FIGS. 10 and 11

A tubular diaphragm valve is an important element in the system since it provides a simple and inexpensive though extremely reliable method for establishing a totally impervious seal for both vacuum and pressure applications. Moreover, such valve should be able to be actuated quickly and easily and should be scaled for virtually any size of pipe. The diaphragm valve described in Canadian Pat. No. 986,491 issued Mar. 30, 1976 to Robert A. Ritter and David G. Turnbull had a diaphragm which was a simple hollow cylinder which was fastened to the central core by means of complex perforated conical clamps. Such devices, which were necessary to prevent billowing of the ends of the diaphragm under conditions of high internal pressure, created an excessive resistance to flow and necessitated the use of an undesirably large valve assembly. In an effort to avoid such problem, the diaphragm valve shown in FIGS. 10 and 11 according to this invention was devised.

The valve 1010 includes a hollow tube 1011 which forms a portion of the flow path of the gas. The valve 1010 includes a hollow core 1012 sealed at one end 1013 with a cap 1014, and provided with annular protrusions 1015 near the cap 1014, and 1016 spaced a predetermined distance from the cap 1014. The core 1012 is provided with one or more perforations 1017 in its wall, located between the two spaced-apart annular protrusions 1015, 1016. A molded diaphragm 1018 is held onto the core 1012 by means of tapered rings 1019. The molded diaphragm 1018 includes two relatively thick walled end portions 1020, provided with annular depressions 1021 therein, with the walls tapering gradually towards the center 1022 to provide a relatively thin walled central portion 1023. The tapered ring 1019 seats in depression 1021 to hold the diaphgram 1018 against protrusion 1016.

In its "open" configuration, as shown in FIG. 10, gas flows in the annular space between the inside wall of tube 1011 and the molded diaphragm 1018. In its "closed" position, as shown in FIG. 11, fluid pressure has been applied to the core 1012 to urge the diaphragm to expand into sealing engagement with the inner wall of tube 1011.

(xiii) Operation of Embodiment of FIGS. 10 and 11

Thus, as described above, the diaphragm valve includes a hollow core sealed at one end and partially enclosed in a specially molded, tubular, elastomeric diaphragm. A seal is created at each end of the diaphragm with the aid of an appropriately tapered ring which forces the diaphragm againt circumferential protrusions located on the outer surface of the hollow core. The protrusion may be formed integrally with the core or may be created by means of "O"-rings mounted in grooves in the core surface. One or more holes through the core wall permit communication between the hollow center and the cavity existing between the tubular diaphragm and the core. Billowing is overcome by the increasing wall thickness at the ends of the diaphragm while the provision of a maximum annular free space minimizes the resistance to flow.

The diaphragm may be produced from any suitable elastomeric material. However, butyl rubber provides certain advantages in the present application since, besides its suitable endurance to repeated flexing, it is virtually totally impervious to air, and more importantly, to water vapor which, if permitted to enter the adsorber system, could eventually result in the irreversible deactivation of the adsorbent.

The core and diaphragm assembly is located axially in a cylindrical tube with a smooth inner wall surface. The tube is adapted at each end for integration into the piping system and may assume a number of configurations. Thus, either or both the entrance to and the exit from the tube may be located in line with or perpendicular to the tube.

Closure of the valve merely requires the application of fluid pressure to the hollow core and, hence, to the inner surface of the diaphragm. This pressure must be of sufficient intensity to expand the diaphragm into sealing engagement with the tube wall and to prevent the collapse of the diaphragm under the influence of the fluid pressure in the piping system.

Selection of an appropriate valve size for any given application must satisfy two criteria. First, the annulus formed between the diaphragm and the inner tube wall must provide a sufficiently large cross section for flow to avoid excessive pressure gradients. Second, the expansion required of the diaphragm to create a complete seal with the inner tube wall must be limited to delay eventual fatigue of the diaphragm material.

(xiv) Description of Storage Vessel of FIG. 12

As noted before, it is desirable to store the enriched gas temporarily in order to equalize the flow of such gas in spite of the cyclical nature of the production. It is preferred that the gas be stored in a storage vessel such as shown in FIG. 12. Here the closed vessel 1210 is a cylindrical vessel and includes a single infeed or outlet aperture 1213 thereinto through which inlet tube 1214 projects. Inlet tube 1214 includes a plurality of longitudinally spaced apart, circumferentially disposed apertures 1216 and terminates in an open outlet 1215. Vessel 1210 is provided with a suitable adsorbent 1211 which has an affinity for the stored gas. The adsorbent in the vessel 1210 is held in place with an adsorbent retainer 1212. Gas to be stored and recovered is led into the vessel 1210 via tube 1213 provided with a uniform array of circumferentially and longitudinally dispersed perforations 1216, through aperture 1213. Because of the presence of the adsorbent 1211, a considerably larger amount of gas may be stored therein. The perforated tube 1214 provides a relatively short adsorption and desorption path and thereby enhances movement of the gas to be stored both into and out of the vessel 1210.

Figure 13:
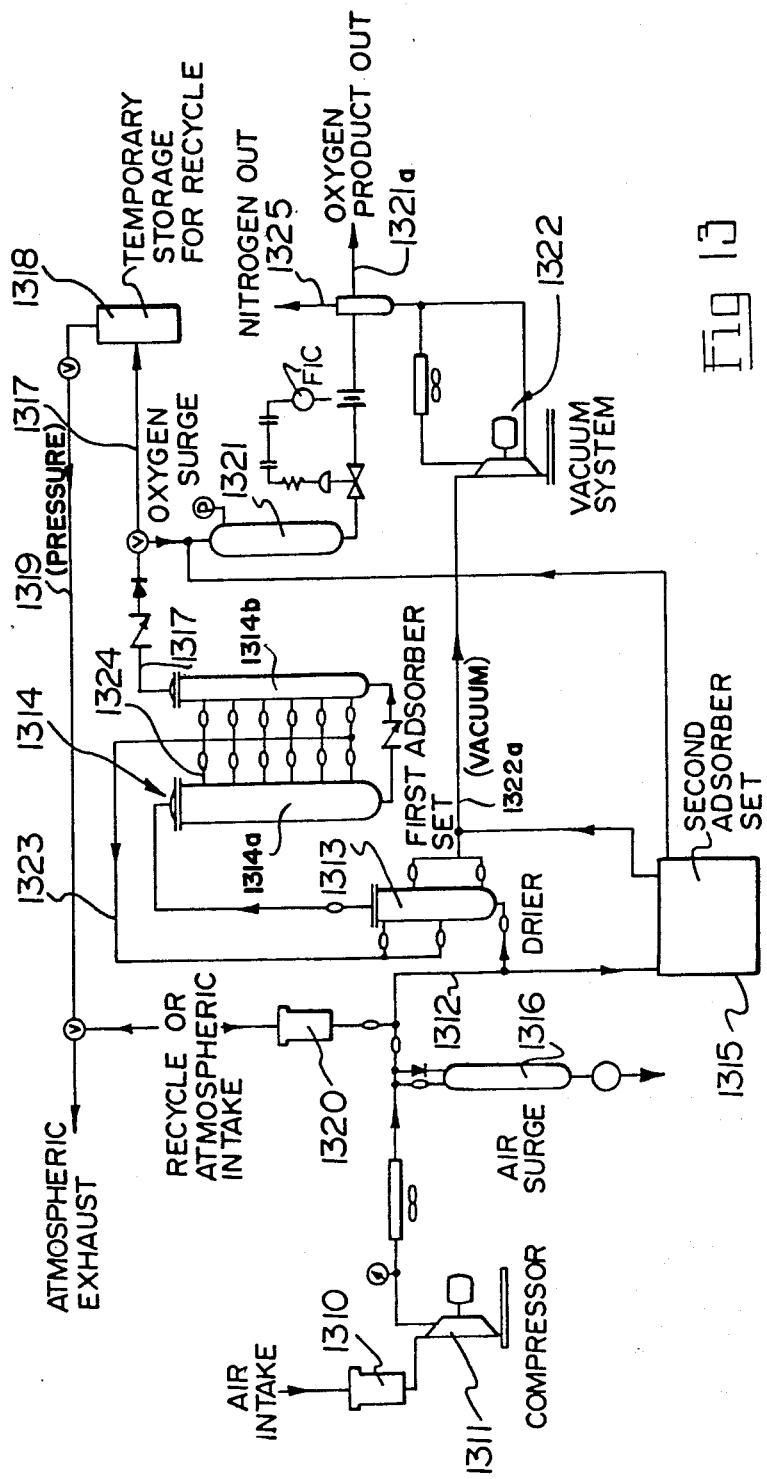
FIG. 13 is a schematic flow diagram of an adsorption method.

(xv) Description of FIG. 13

As seen in FIG. 13, air intake from air intake vessel 1310 is compressed by compressor 1311 to any desired pressure and then is passed, via line 1312 to the inlet of a drier 1313 from whence it is fed to the first adsorber set 1314, which is in its adsorption mode. The second adsorber set 1315, which is identical with the first adsorber 1314, is in its regeneration phase. An air surge tank 1316 is provided in line 1312 to provide substantially constant flow of air to the adsorber system.

The air from which a portion of the nitrogen has been adsorbed in the first adsorber set 1314 is passed via line 1317 to a recycle temporary storage tank 1318. This tank may be a simple "empty" tank or may have the structure shown in FIG. 12. When the percentage oxygen in storage tank 1318 reaches a specified level, i.e., about 30% to about 60%, the air intake to the first adsorber set 1314, is no either supplemented or replaced by, the oxygen-enriched air in storage tank 1318 via line 1319 passing through air tank 1320. Enrichment of the feed air by adsorption of nitrogen then continues until a pressure is detected in the outflow line 1317 which is indicative of the presence of nitrogen, at which time the first adsorber set 1314 is switched from adsorption to desorption, and the second adsorber set is switched from desorption to adsorption. The oxygen product during this stage may either be fed to the recycle temporary storage tank 1318, or may be fed through the oxygen surge tank 1321 to the oxygen product recovery line 1321a.

The start-up for adsorption in the second adsorber set 1315, which involves filling the adsorber to atmospheric pressure with air, is preferably accomplished with the oxygen-enriched air from the recycle temporary storage tank 1318. The adsorption procedure for the second adsorber set 1315 follows that for the first stage adsorber set 1314.

reduction in total pumpdown time is systematically enhanced by an increase in the number of vessels. Illustrative properties of the single vessel system and the double and triple vessel cascade system are presented in Table 1. It should be noted that the comparison is based upon systems of equal adsorbent volume and energy consumption.

TABLE 1

|  | SWITCHING PRESSURE | RELATIVE PUMPDOWN TIME | % REDUCTION IN PUMPDOWN TIME | % REDUCTION IN ADSORBER CAPACITY | RELATIVE PRODUCTION CAPACITY |
|---|---|---|---|---|---|
| Single Vessel | — | 1.00 | 0 | 0 | 1.0 |
| Double Vessel | 50 mm | 0.59 | 41% | 5.4% | 1.60 |
| Triple Vessel | 150 mm, 50 mm | 0.43 | 57% | 14.6% | 1.99 |

In the desorption phase, the vacuum system 1322 applies a vacuum to drier 1322a which applies vacuum to the evacuation tube 1323 leading from the secondary outlets 1324 of the first adsorber set. The desorbed gases, mainly nitrogen, are vented at nitrogen gas outlet 1325.

It has been found that the use of oxygen-enriched art as a feed in the adsorption cycle one or more times provides a suprisingly more pure oxygen product at a given period of time in the adsorption cycle than would be expected merely by additive effects.

DESCRIPTION OF THEORETICAL ANALYSIS OF CASCADE SYSTEM

The advantage of the cascade system may be demonstrated by means of a simplified theoretical analysis of the system. Assume that in the interests of obtaining a suitable oxygen product purity, it is necessary during regeneration to reduce the residual $N_2$ adsorbate partial pressure to 5 mm absolute. Now, since the amount of $N_2$ present on the adsorbent is linearly proportional to its partial pressure, some 0.7% of the $N_2$ present at 760 absolute pressure remains after regeneration. Had the regeneration been terminated at 50 mm absolute pressure, the amount remaining would have been 6.6% of that at 760 mm. However, the time required to reduce the pressure from 50 mm to 5 mm, thereby removing an additional 6% of nitrogen, represents 46% of the total time required to reduce the pressure from 760 mm to 5 mm. If, on the other hand, the system consists of a double vessel cascade with a vessel volume ratio of the primary stage to the secondary stage of 9:1 and regeneration to 5 mm from 50 mm is applied only to the second vessel, the time required to achieve this final stage of nitrogen removal represents only 8% of the total time required to reduce the pressure from 760 in both vessels to 50 mm in the first and 5 mm in the second.

Thus, the cascade system in comparison with the single vessel system exhibits a net reduction in pumpdown time of approximately 41% with a loss in adsorption capacity of only 5.4%. The substantially reduced pumpdown time permits an increase in cycle frequency which not only offsets this reduction in adsorbent capacity but provides a significant increase in oxygen production for a given system size and energy input.

The principle of the cascade system is not limited to two vessel combinations but, rather, can be extended to any number of vessels within practical limits. The pumpdown behaviours of the two vessel and three vessel cascade under specified conditions indicate that The last column in Table 1 demonstrates the significant increase in production capacity available through the application of the cascade principle.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claim.

What I claim is:

1. In combination, a diaphragm valve and a hollow, gas-conducting tube to control the flow of gas therethrough comprising:

(1) a capped hollow core connected at only one area to said hollow, gas-conducting tube, said capped, hollow core being provided with at least one perforation through the wall thereof and with a pair of longitudinally spaced-apart annular protrusions, one on each longitudinal side of said at least one perforation;

(2) a molded cylindrical tubular elastomeric diaphragm secured concentrically to said hollow core at said annular protrusions which comprise a pair of spaced-apart locations on either side of said at least one perforation, said diaphragm having walls adjacent the secured ends thereof which are thicker internally than the walls at the region of said at least one perforation so as to maintain the outer cylindrical tubular shape of said diaphragm, said thicker internal walls each being provided with a pair of longitudinally spaced-apart abutments, said diaphragm thereby providing an annular flow path for gas between the outside walls of said diaphragm and the inner walls of said hollow, gas-conducting tube to permit the flow of gas therethrough;

(3) an annular encircling band surrounding said diaphragm at said annular protrusions, with each pair of longitudinally spaced-apart abutments being disposed on either side of an associated protrusion, said band being radially spaced from the inner walls of said gas-conducting tube, whereby to urge said diaphragm against said protrusions;

and (4) means for applying gaseous pressure to the interior of said capped hollow core;

thereby (5) to expand said diaphragm radially outwardly so that its outside walls are in sealing engagement with the inner walls of said hollow gas conducting tube to stop the flow of gas therethrough.

2. The diaphragm valve of claim 1 wherein said hollow core is provided with a plurality of perforations.

3. The combination of claim 1, wherein said annular encircling band comprises tapered rings.

4. The diaphragm valve of claim 1 wherein said diaphragm is formed from butyl rubber.

* * * * *